Nov. 15, 1966  B. JOHNSON  3,285,231
LIVESTOCK INSECTICIDE APPLICATOR
Filed June 28, 1965  2 Sheets-Sheet 1
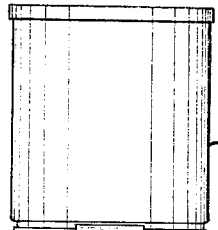
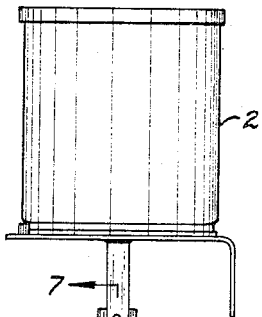
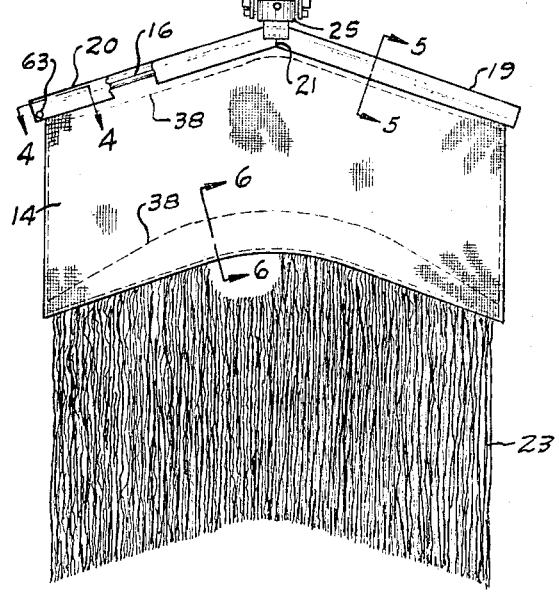
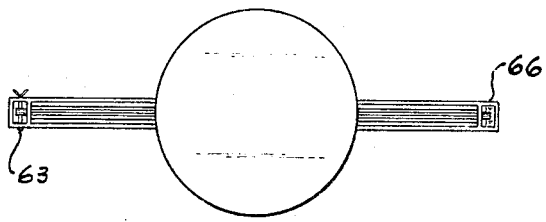
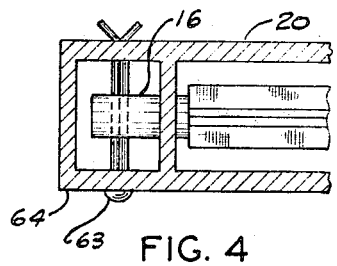
INVENTOR.
Bill Johnson
BY Scott L. Horwiel
Atty Nov. 15, 1966    B. JOHNSON    3,285,231
LIVESTOCK INSECTICIDE APPLICATOR
Filed June 28, 1965    2 Sheets-Sheet 2

INVENTOR.
Bell Johnson
BY Scott L. Howiel
Atty

United States Patent Office 3,285,231
Patented Nov. 15, 1966

3,285,231
LIVESTOCK INSECTICIDE APPLICATOR
Bill Johnson, 613 N. Central Ave., Phoenix, Ariz.
Filed June 28, 1965, Ser. No. 467,487
4 Claims. (Cl. 119—157)

This application concerns an insecticide applicator for livestock.

Heretofore, applicators for liquid insecticides have been made which may be used directly on the animals back or the like, but these were somewhat lacking in convenience and utility, therefore, it is an object of this present invention to provide a means for the automatic application of liquid insecticides to the back of a cow or other animal as it passes through a limited passageway.

Another object is to provide an automatic means which will release liquid insecticide when a valve is opened by the movement of an animal through a limited space and at the same time release insecticide which will fall directly upon the back of the animal and which will be brushed in place by the movement of the animal through the enclosure.

Still another object is to provide a means for releasing liquid insecticide by the movement of the animal beneath the curtain of applying material which acts both as a brush and as a distributor of the material.

Still another object is to provide a valve which will release liquid insecticide held in a liquid vehicle only during the time the animal passes beneath it and which will shut off the insecticide and its vehicle when the animal departs from the limited passageway.

Other objects will appear hereinafter.

The liquid insecticides hereinabove mentioned are those having a fluid vehicle of chiefly petroleum oils, or the like, in which poisons or insecticides are dissolved. These may be soluble substances taken from the group of creosote derivatives or the like, to which said insecticides may be added.

Figure 5:
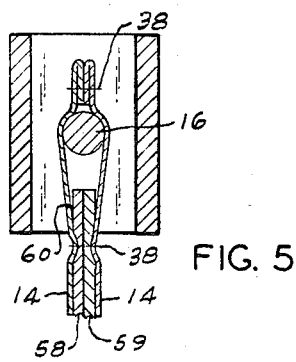
Figure 6:
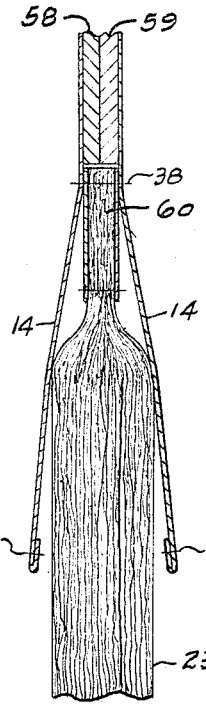
Figure 7:
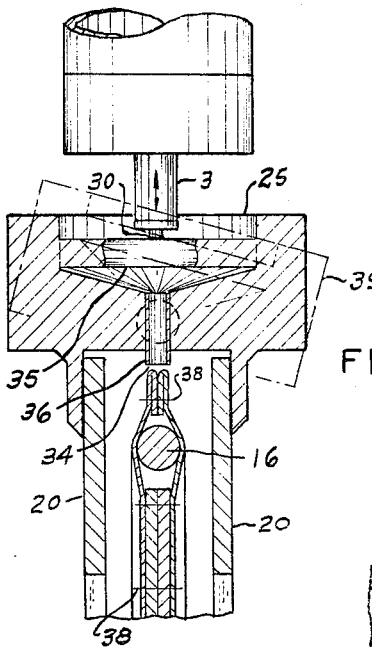
Figure 8:
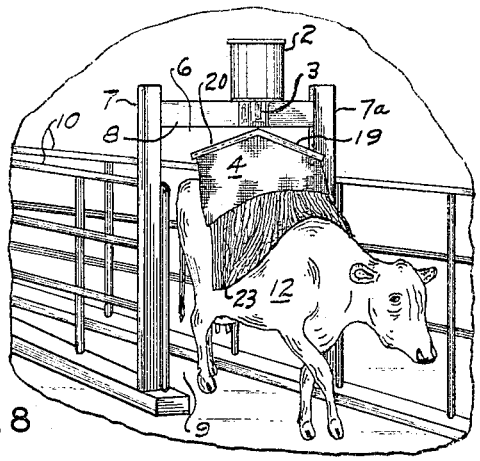
Figure 9:
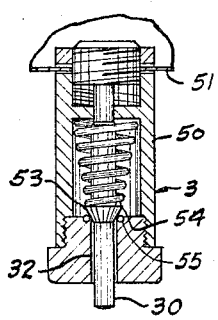

I attain the foregoing objects by the devices, parts, and combination of parts shown in the accompanying drawings in which:

FIGURE 1 is a front elevational view of the applicator;
FIGURE 2 is a side elevational view thereof;
FIGURE 3 is a plan view thereof;
FIGURE 4 is a fragmentary and portion of one of the supporting arms that hold the applicator with the top portion sectioned on line 4—4 of FIGURE 1 to show interior construction.
FIGURE 5 is a sectional view of one of the supporting arms of the applicator, as it would appear on line 5—5 of FIGURE 1.
FIGURE 6 is an end view of the applicator brush sectioned off to show the interior construction;
FIGURE 7 is a cross section of the valve structure of the applicator;
FIGURE 8 is a perspective view of the applicator in use and as applied to the application of insecticide to an animal.
And FIGURE 9 is a mid sectional view of the insecticide release valve.

Similar numerals apply to similar parts in the several views.

The applicator consists mainly of three parts, a fluid insecticide storage tank 2, a valve mechanism 3 in the bottom of said storage tank and a mop or brush-like structure 4 to apply the fluid insecticide to the back of the animal.

The tank 2 is held above the passageway 6 formed by two stanchions 7 and 7A which hold a cross piece 8 over a driveway 9. Suitable guide rails 10 are provided to guide the animal 12 through the driveway and beneath the applicator 4.

The applicator is composed of a curtain made of a pair of canvas sheets 14 suspended on a cross member 16 which includes a pair of arms 19 and 20 slanting downwardly and outwardly from their middle 21 which is also the point of suspension.

From these arms canvas sheets or shrouds hang downwardly. A brush-like applicator 4, made of a large number of wicking strings 23. These strings are made of loosely twisted cotton material.

Insecticide carried in a light petroleum vehicle is introduced into a cup 25 which is attached to the two arms 19 and 20, and holds them together and also provides a means for catching insecticide as it is released from the tank 2 by valve 3.

Within and above cup 25 a plunger or piston rod 30 acts as a valve stem to open valve plug 53. These parts are arranged so that when the rod 30 is raised, insecticide will be released from the tube 50 and will trickle down the valve stem 30 into the cup 25. In the bottom of the cup there is a vent pipe 36, the lower end of which is directly over the apex portion of the canvas shrouds on supporting arms 19 and 20. This construction permits insecticide which has accumulated in cup 25 to exit and drop onto the top most portion or apex of the shrouds and arms 19 and 20.

Along the lower edges of the canvas shrouds 14 the strings 23 which compose the mop or brush are secured by stitching 38. This permits insecticide which is moved into the pocket formed by the two shrouds to accumulate and move by gravity and capillary attraction into the strings constituting the mop or brush.

In FIGURE 7, movement of cup 25 relative to valve stem 30 is shown in broken lines 39 which indicate the outline of the cup when moved. This movement is produced by contact with the back of the animal 12 as it passes through the runway 9.

Disposed between the two canvas shrouds and extending from the supporting arms 19 and 20, there are felt strips 58 and 59 which have a wicking section. These strips are positioned so as to receive insecticide along these top edges and spread it and distribute it to the top of the mop 23. It is to be noted that the mop or brush previously mentioned consists of a large number of strings which hang loosely from the lower edge of the shrouds and are secured by the stitching 38.

FIGURE 9 shows the interior construction of the valve and liquid release. This valve consists of a tubular casing 50 which is screwed into the bottom of the supporting plate 51 of tank 2. This casing contains the axially disposed valve stem 30 which has valve plug 53 on an annular shoulder 54. A neoprene "O" ring 55 forms the seal between the shoulder and the seat. Upward movement of the valve stem proper releases fluid from the tank 2 into the interior of the tubular portion, from the tubular cavity the oil drips down into the lower end of the stem marked 30. This fluid insecticide is then caught in the cup 25 and later collected in the conical bottom of this cup and released through tube 36.

Oil or insecticides dripping from this tube end 34 is deposited on the upper edge of the folds of the shrouds which enclose the top ends of mop strings 60. It is to be understood that the applicator assembly swings back and forth on the transverse supporting arm 16 according to contact with the back of the animal. As shown in FIGURE 8, if the animal is tall his back will contact the shrouds, otherwise, if the animal is shorter, its back will contact the mop strings only. In either event, such fluid as is held by the strings will be deposited on the animal's back and sides.

In order to change the applicator in case it becomes excessively fouled with animal hair and dirt, it is only necessary to remove pin 63 from the supporting holes in frame end 64 and from the end of rod 16. This will permit the rod 16 to fall downward so that the entire assembly of canvas shrouds and mop may be lowered away from the supporting arms 19 and 20 and supported in box 66 at the outer end of arm 20, the mop assembly may be swung far enough down so that it may be removed from the arms. A new mop assembly may then be applied, and the mop raised into position and cotter pin 63 reinserted.

It is to be noted that the loose suspension of the applicator permits the mop and its suspension to move freely back and forth in the direction of travel of the animal through the passageway. The applicator assembly may also twist or turn on this means of support and it may move sideways slightly in order to make contact with the back of the animal. Note that the tube 33 releases insecticide only when lifted by contact with the back of the animal. At other times it is shut off and does not waste insecticide.

I claim:

1. An insecticide applicator mechanism for applying fluid insecticide to the backs of animals progressing through a passageway, comprising an insecticide tank, having a bottom and a valve centrally positioned therein with a shutoff valve stem operating axially and vertically therein, arranged to open when lifted, an applicator means having inclined laterally extending radial arms joined at their apex and slanting downwardly from the point of juncture, a cup centrally supported on said arms and disposed below said valve, said applicator means including a pliant applicator having two canvas side pieces constituting shrouds depending from said arms and attached at the bottom to a mop type brush consisting of a plurality of wicking cotton strings extending along the lower edges of said shrouds, the lower ends of the strings of said mop being cut to form a curved edge conforming to the shape of the back of the animal passing therebeneath.

2. An insecticide applicator mechanism for applying fluid insecticide to the backs of animals progressing through a passageway, comprising a pliant applicator having two canvas side pieces constituting shrouds and depending from inverted "V" arms, insecticide tank having a bottom with a valve centrally positioned therein and a shut off valve plug to normally shut off fluid from said tank and open when the applicator valve stem is raised, a cup centrally positioned below the apex of said arms and below said valve having a centrally located exit hole and a pipe connecting thereto disposed over the apex of said shrouds, a mop type brush consisting of a plurality of wicking strings extending along the lower edges of said shrouds, felt wicks within the space between said shrouds to pick up fluid and convey it to wicking strings; the lower ends of said wicking strings being cut to form a curved edge conforming to the shape of the back of an animal passing therebeneath.

3. The applicator described in claim 2 wherein the arms are supported on said frame by pivots, one of said pivots being removably inserted so that one end of the arm assembly can be lowered to remove said shrouds while the other end pivots on the fixed supporting pin.

4. An insecticide applicator mechanism for applying fluid insecticide to the backs of animals progressing through a passageway, comprising a frame disposed over a floor in a passageway, a pliant applicator over said passageway having two canvas side pieces constituting shrouds and depending from inverted "V" arms, on said frame, an insecticide tank having a bottom with a valve centrally positioned therein and a shut off valve plug on a stem to normally shut off fluid from said tank and open when said stem is raised, a cup centrally positioned on said arms below the juncture of said arms and below said valve, having a centrally located exit hole and a pipe connecting thereto disposed over the apex of said shrouds, a mop type brush consisting of a plurality of wicking strings extending along the lower edges of said shrouds, felt wicks within the space between said shrouds to pick up fluid and convey it to said wicking strings; the lower ends of said wicking strings being cut to form a curved edge conforming to the shape of the back of an animal passing therebeneath in said passageway.

References Cited by the Examiner

UNITED STATES PATENTS

| 987,433 | 3/1911 | Crawford | 119—157 |
| 1,184,438 | 5/1916 | Gamble et al. | 119—157 |
| 1,581,544 | 4/1926 | Pflaum | 119—157 |
| 2,800,108 | 7/1957 | Duff | 119—157 |
| 2,988,051 | 6/1961 | Minock | 119—157 |
| 3,079,893 | 3/1963 | Francisco | 119—157 |
| 3,098,466 | 7/1963 | O'Donnell | 119—157 |
| 3,137,274 | 6/1964 | Palmer | 119—157 |

SAMUEL KOREN, *Primary Examiner.*

ALDRICH F. MEDBERY, *Examiner.*